United States Patent [19]

Eves, II et al.

[11] 4,441,003
[45] Apr. 3, 1984

[54] CONVEYORIZED MICROWAVE OVEN WITH MULTIPLE LANES

[75] Inventors: E. Eugene Eves, II, Westford; Richard H. Edgar, Chelmsford, both of Mass.

[73] Assignee: Raytheon Company, Lexington, Mass.

[21] Appl. No.: 369,198

[22] Filed: Apr. 16, 1982

[51] Int. Cl.³ .............................................. H05B 9/06
[52] U.S. Cl. ....................... 219/10.55 A; 219/10.55 M; 219/10.55 R; 198/570; 99/386
[58] Field of Search ................ 219/10.55 A, 10.55 R, 219/10.55 E, 10.55 M; 198/570; 99/386, 443 C

[56] References Cited
U.S. PATENT DOCUMENTS

3,372,635 3/1968 Meyer ................................. 198/570
4,176,267 11/1979 Rueggeberg ................. 219/10.55 A
4,182,946 1/1980 Wayne et al. ................ 219/10.55 A
4,227,063 10/1980 Edgar et al. ................. 219/10.55 A
4,253,005 2/1981 Gordon et al. .............. 219/10.55 A

Primary Examiner—B. A. Reynolds
Assistant Examiner—M. M. Lateef
Attorney, Agent, or Firm—William R. Clark; Joseph D. Pannone

[57] ABSTRACT

A conveyorized microwave oven having multiple independently controlled lanes. Specifically, a plurality of conveyor belts are directed into, through, and out of the microwave cavity. The belts can be operated at different speeds so that foods requiring different microwave exposure times can be cooked simultaneously. Suppression tunnels surrounding the conveyor belts at the openings into and out of the cavity prevent the escape of microwave energy from the cavity.

1 Claim, 8 Drawing Figures

CONVEYORIZED MICROWAVE OVEN WITH MULTIPLE LANES

BACKGROUND OF THE INVENTION

For some commercial and industrial applications, conveyorized microwave ovens have advantages over batch type microwave ovens. One advantage is that conveyor systems generally have higher throughput. Another advantage is that automatic loading and unloading equipment is more readily adaptable to conveyor systems. Accordingly, there is wide spread usage of conveyorized microwave ovens.

One common application for conveyorized microwave ovens is food processing. For this application, varying amounts of microwave exposure may be necessary for different cooking tasks. For example, equivalent weights of bacon and meat patties may require different amounts of energy to cook. Also, for a particular food type such as bacon, varying amounts of BTUs may be required depending on the initial and final states of the cooking task. More specifically, the initial state may be frozen, refrigerator temperature, or room temperature. The final state may be precooked or fully cooked. Precooked may be defined as cooking out grease until the product weighs 40% of its initial weight; fully cooked may be when the final product weighs 30% of its initial weight.

It is only under the most ideal and rare combination of parameters that two different food types may be simultaneously cooked to their respective desired donenesses. Also, it is apparent that the same food type can not be simultaneously processed from different initial states nor to different final states. Accordingly, in prior art conveyorized microwave ovens, the line is shut down and the power of the oven or speed of the belt is changed to switch from one cooking task to another. This procedure reduces system throughput and creates scheduling problems.

SUMMARY OF THE INVENTION

The invention discloses a conveyorized microwave oven comprising a first microwave transparent conveyor belt forming a continuous loop, a second microwave transparent conveyor belt forming a continuous loop, a conductive cavity through which the first and second conveyor belts pass, means for energizing the cavity with microwave energy, and means for independently advancing the belts. Preferably, suppression tunnels may be positioned around the belts and adjacent to the cavity to prevent the escape of microwave energy from the cavity. Because the belts can be operated at different speeds, cooking tasks requiring different microwave energy exposure times can be simultaneously processed. This provides the operator with greater flexibility in scheduling the cooking tasks. Also, the single cavity with multiple lanes can be operated less expensively and in a smaller installation space than multiple cavities with single lanes.

The invention also teaches a conveyorized microwave oven comprising a conductive cavity having two apertures for providing continuous access to the interior thereof, a first conveyor belt passing through the apertures for transporting objects through the cavity, a second conveyor belt passing through the apertures for transporting objects through the cavity, means for energizing the cavity with microwave energy, and means for moving the first and second conveyors in continuous loops, the moving means comprising means for advancing the first conveyor belt at a speed different than the second conveyor belt.

The invention may also be practiced by a conveyorized microwave oven comprising a conductive cavity having an entrance port and an exit port for providing continuous access to the interior of the cavity, means for energizing the cavity with microwave energy, first means for transporting objects through the entrance port, through the cavity, and out of the cavity through the exit port, the first means transporting objects at a first speed, and second means for transporting objects through the entrance port, through the cavity, and out of the cavity through the exit port, the second means transporting objects at a second speed which is different than the first speed. Preferably, the transporting means comprise microwave transparent conveyor belts. Also, the transporting means may comprise first and second motors respectively coupled to the first and second belts.

Also, the invention discloses a conveyorized microwave oven comprising a conductive cavity having an entrance port and an exit port for providing continuous access to the interior of the cavity, means for providing microwave energy to the cavity, means for preventing the escape of microwave energy from the cavity through the entrance port and the exit port, the preventing means comprising first and second microwave energy suppression tunnels respectively surrounding the entrance and exit ports, the tunnels extending outwardly from the cavity, a first microwave transparent conveyor belt providing a first lane through the first tunnel, the cavity, and out the second tunnel, a second microwave transparent conveyor belt providing a second lane through the first tunnel, the cavity, and out the second tunnel, and means for independently moving the first and second belts.

The invention may be practiced by the method of simultaneously performing a plurality of processing tasks with a conveyorized microwave oven, comprising the steps of loading product of a first processing task on a first conveyor belt passing through the conveyorized microwave oven, loading product of a second processing task on a second conveyor belt passing through the conveyorized microwave oven, and advancing the first and second belts through the oven at different speeds to provide the product of the first task with a different microwave exposure time than the product of the second task.

BRIEF DESCRIPTION OF THE DRAWINGS

The foregoing objects and advantages of the invention will be more fully understood by reading the Description of the Preferred Embodiment with reference to the drawings wherein.

DESCRIPTION OF THE PREFERRED EMBODIMENT

Figure 1:
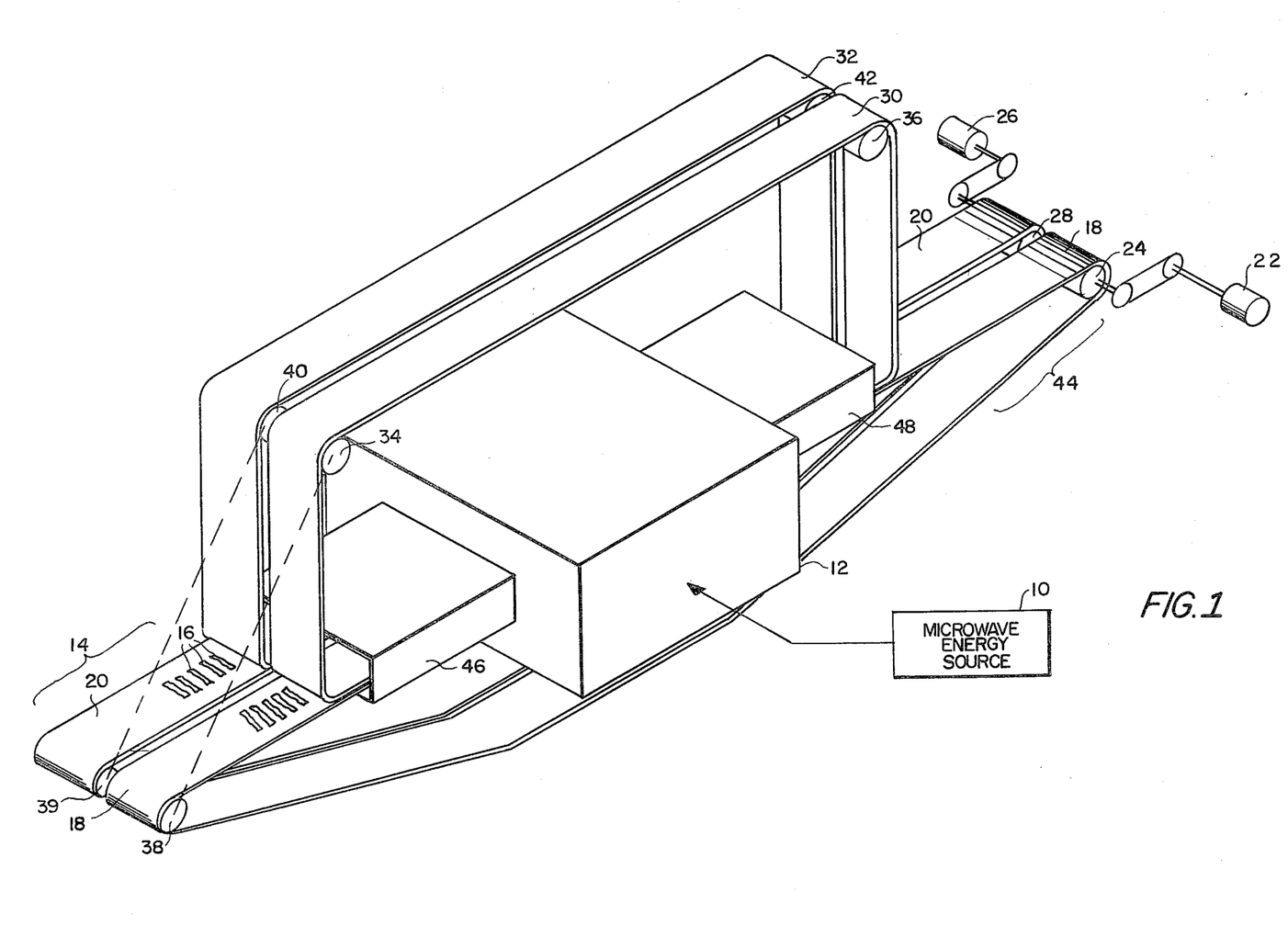
FIG. 1 is a diagrammatical drawing of a conveyorized microwave heating system embodying the invention.

Referring to FIG. 1, there is shown a diagrammatical drawing of a conveyorized microwave heating system embodying the invention to advantage. Microwave energy is coupled from microwave energy source 10 to microwave cavity 12. At loading zone 14, objects 16 to be heated are positioned on either conveyor belt 18 or 20. Conveyor belt 18 is driven in a continuous loop by motor 22 which is coupled to drum or axle 24 which may have a plurality of sprockets. Conveyor belt 20 is driven in a continuous loop by motor 26 which is coupled to drum or axle 28 which also may have a plurality of sprockets. Motors 22 and 26 may be operated at different speeds so that respective belts 18 and 20 move through cavity 12 at different speeds thereby exposing objects positioned on them to the microwave energy for different time periods. Accordingly, food objects supported on the two respective belts may be simultaneously cooked to different degrees of doneness. Also, different food types requiring different amounts of microwave exposure may be cooked simultaneously. Further, same food types having different initial states may be cooked to the same doneness. In an alternate embodiment, a single motor may be used and coupled to respective axles 24 and 28 using different ratios of gears.

Still referring to FIG. 1, overhead restraint belts 30 and 32 also pass in continuous loops through cavity 12. Belt 30 is guided by drums or axles 34 and 36. Axle 34 which may have a plurality of sprockets is mechanically coupled to axle 38 of belt 18. Accordingly, belt 30, as shown, is partially supported by belt 18 and advances through cavity 12 at the same speed. Likewise, belt 32 is guided on drums or axles 40 and 42. Axle 40 which may have a plurality of sprockets is mechanically coupled to axle 39 so that belt 32 is partially supported by belt 20 and they move through cavity 12 at the same speed. In cavity 12, the weight of belts 30 and 32 press downward on respective belts 18 and 20 and accordingly create horizontal restraint on any objects 16 supported on belts 18 and 20. This has particular advantage with food items such as bacon or meat patties when it is desirable that the cooked product have a particular size or shape. More specifically, without the sandwich type restraint caused by the downward pressure of belts 30 and 32, bacon would ripple thus causing a shape which is difficult to package for sale. Also, the restraint can be used to control horizontal shrinkage so that the cooked product has a desired size. In other words, with the restraint of respective belts 30 and 32, cooked bacon is in larger slices and flat so that it can easily be packaged for sale. The cooked product is removed from the belts at unloading zone 44. Microwave energy is prevented from escaping from cavity 12 through the conveyor belt entrance and exit openings by respective suppression tunnels 46 and 48.

Figure 2:
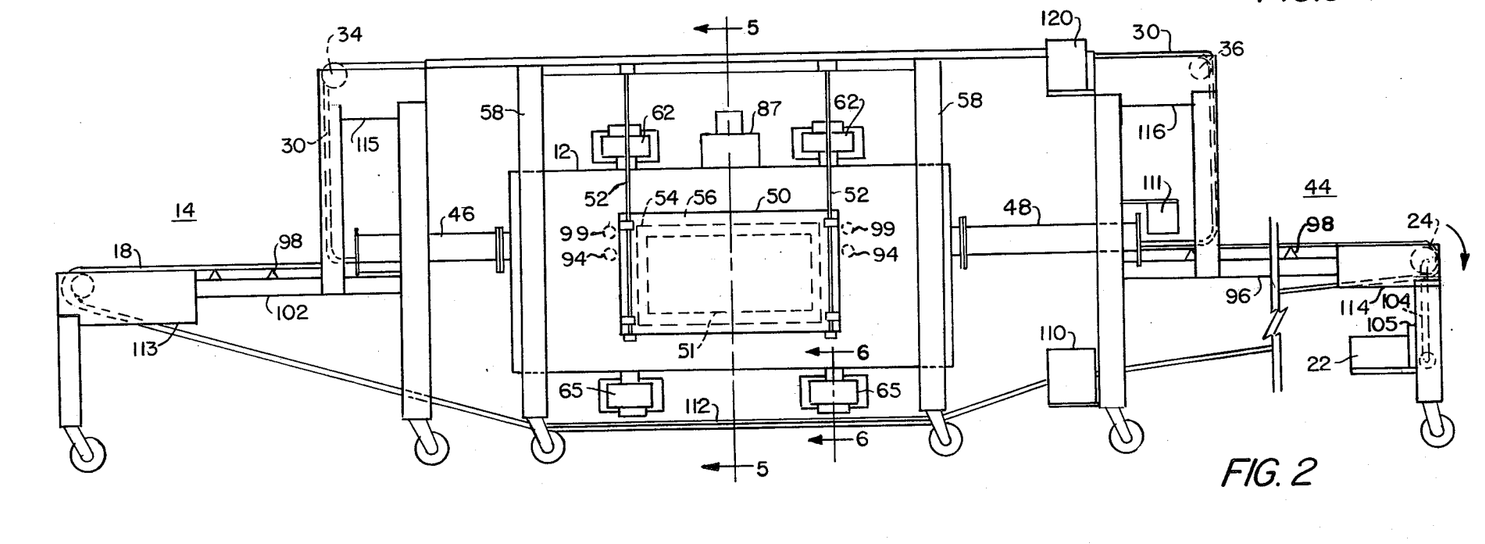
FIG. 2 is a front elevation view of a hardware implementation of the system of FIG. 1.
Figure 3:
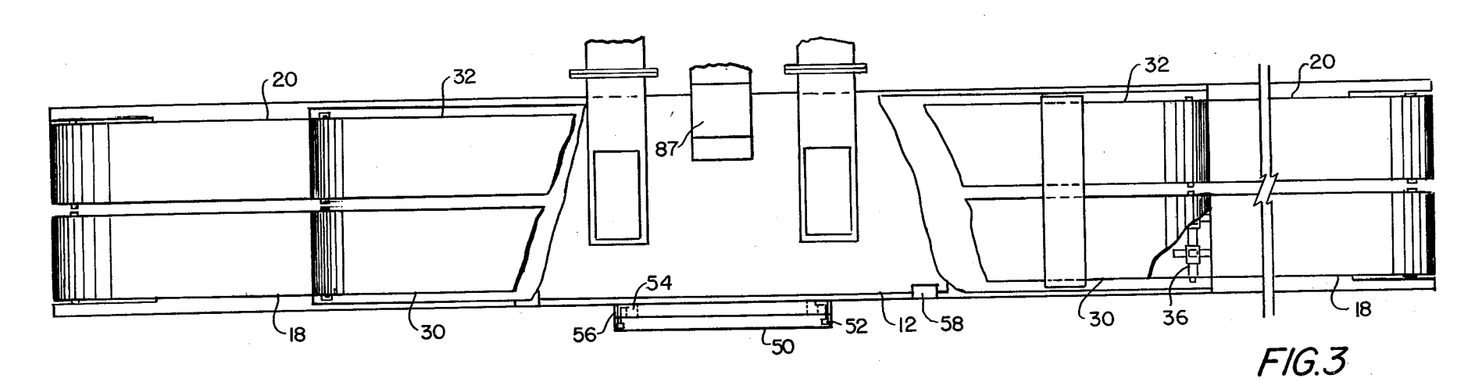
FIG. 3 is a top view of the system of FIG. 2.
Figure 4:
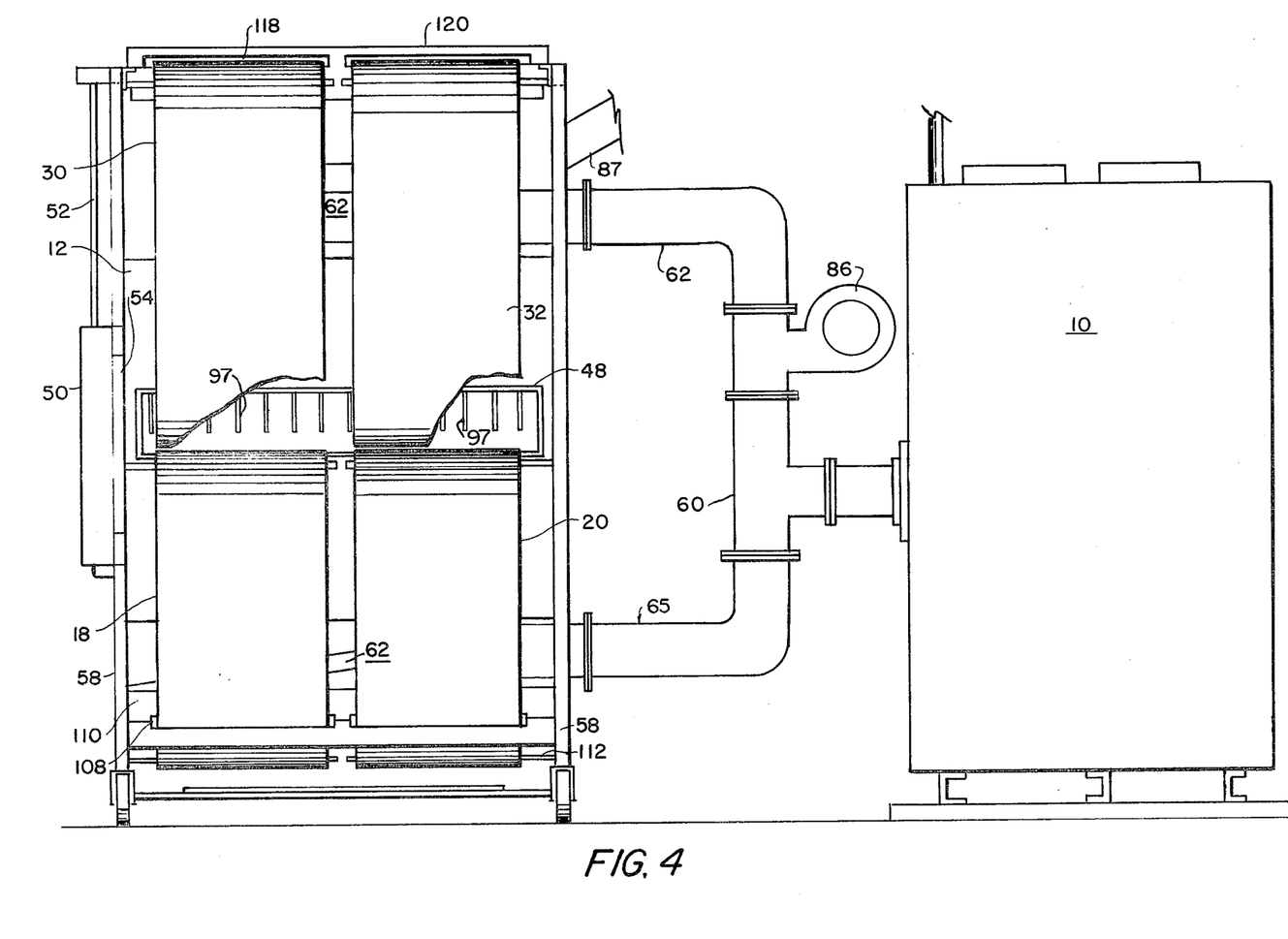
FIG. 4 is an end elevation view of the system of FIG. 2.

Referring to FIGS. 2, 3, and 4, front elevation, top, and end views of an implementation of the diagrammatical drawing of the conveyorized microwave heating system of FIG. 1 are respectively shown. Like numerals refer to the same parts throughout the drawings. Cavity 12 is substantially rectangular and formed from sheets of metal such as stainless steel or aluminum. Door 50 provides interior cavity access for such functions as preventive maintenance, cleaning, or repair. Door 50 is connected to slide rods 52 so that the door is opened in a vertical direction to reduce the required side clearance. Slide rods 52 preferably taper slightly outwardly in the upward direction. In the downward or closed position, the periphery of door 50 is adjacent to conventional choke 54 around the perimeter of the door opening 51. Preferably, the choke may comprise a slotted quarter-wavelength choke as described in U.S. Pat. No. 3,767,884. A ring of microwave absorbing material 56 may be positioned outside the perimeter of choke 54 to absorb any microwave energy that escapes past the choke. In an alternate configuration, the choke may be fabricated into the door rather than being connected to the outside surface of cavity 12.

Cavity 12 is elevated off the floor by four legs 58 which are connected adjacent to the four corners of the cavity; the legs may preferably be connected by bolts or welding.

As shown in FIG. 4, the microwave energy source 10 may be a remote transmitter such as a Raytheon Model MK50B transmitter which provides 30 kw of CW microwave energy at 915 MHz. The output of each of two transmitters is divided at tees 60, the upper waveguide 62 being coupled to a top feed structure 64 and the bottom waveguide 65 being coupled to a bottom feed structure 64. Accordingly, as shown, there may preferably be a total of four feed structures coupling microwave energy into cavity 12, each feed structure 64 providing approximately 15 kw of 915 MHz CW power. In an alternate configuration, magnetrons could be mounted on cavity 12.

Figure 6:
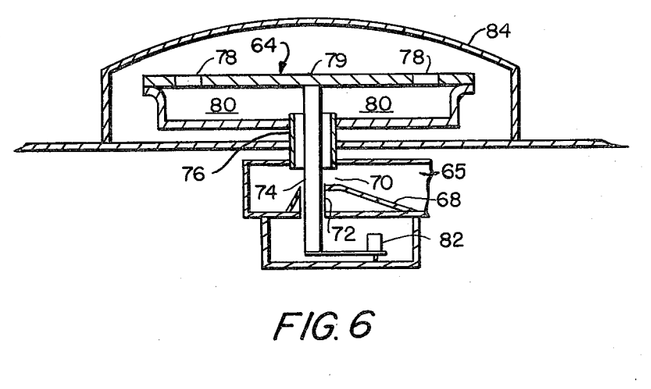
FIG. 6 is a view taken along line 6—6 of FIG. 2.

Referring to FIG. 6, a cross-sectional view taken along line 6—6 of FIG. 2 is shown. As illustrated in the view of the bottom waveguide 65, each waveguide 62 and 65 has a transition ramp 68 which forms a reduced profile waveguide 70. Accordingly, without substantially increasing the vertical profile, a choking structure 72 may be utilized to prevent the escape of microwave energy around central conductor 74. In combination with central conductor 74, outer conductor 76 forms a coaxial transmission line for coupling the microwave energy to feed structures 64.

Feed structure 64 preferably comprises a plurality of slot antennas 78 in a plate 79 with radial waveguides 80 coupling the microwave energy from the central region radially outwardly to the slot antennas 78. The plate is connected to central conductor 74. Motor 82 rotates central conductor 74 and connected feed structure 64 so that the radiated patterns rotate about the axis of the central conductor. Accordingly, uniform product heating is provided. A microwave transparent dome 84 is positioned over each feed structure 64 to prevent grease and other cooking products from accumulating thereon. Also, blower 86 as shown in FIG. 4, creates a flow of air through the waveguides to prevent cooking product vapors from entering the feed structures 64. Air exhaust duct 87 provides a way of removing vapors from cavity 12. It may be preferable to provide a negative pressure in duct 87 so that air is sucked into the duct; accordingly, vapors and steam will not exit cavity 12 through tunnels 46 and 48 adjacent to where operators are standing. A metal screen (not shown) prevents escape of microwave energy through duct 87.

Figure 5:
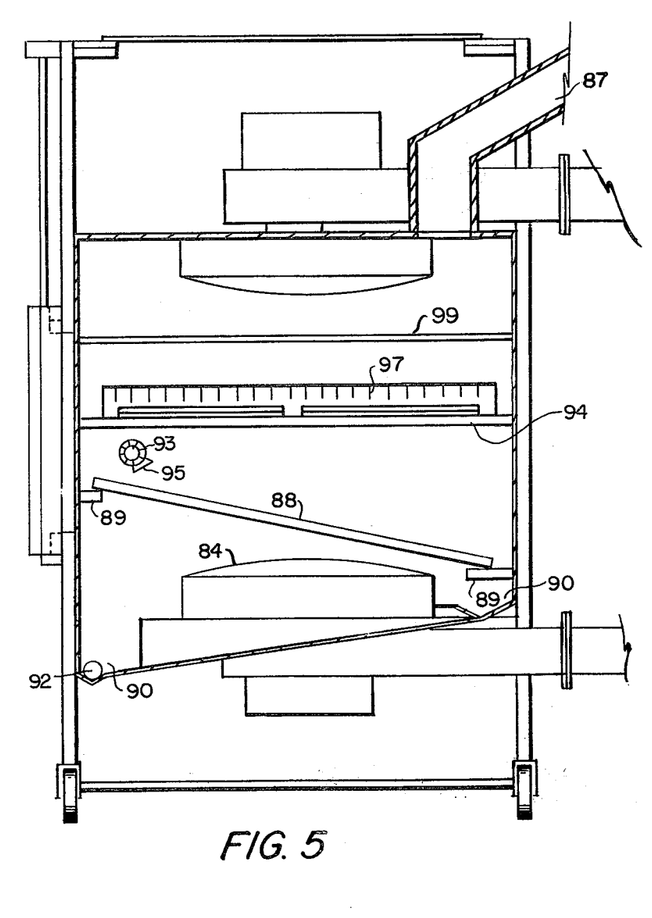
FIG. 5 is a view taken along line 5—5 of FIG. 2.

Referring to FIG. 5, a view taken along line 5—5 of FIG. 2 is shown. Rigid sheet 88 of a microwave transparent material such as polypropylene is mounted at an angle to direct liquid by-products of cooking such as grease to the side of cavity 12. More specifically, a plurality of individual sections may be used to form sheet 88 so that each section is small enough to be removed through door opening 51 for cleaning and repair. Protrusions 89 from the interior side walls of cavity 12 may be used to hold sheet 88 in place. The liquid by-products drain down the slope of sheet 88 and collect in channels 90 around the perimeter and through the center of the cavity floor. Channel 90 is deeper at the front of the cavity so that the liquid by-products drain to tube 92 for exit and disposal from the cavity. Tube 92 has a diameter below cutoff for the microwave frequency so that microwave energy will not escape from the cavity. Metal pipe 93 is positioned above sheet 88 and extends substantially the length of cavity 12. At various points along pipe 93 there are attached nozzle fittings 95. Sheet 88 and other parts of the interior of cavity 12 may be periodically cleaned by directing hot water or more preferably soapy hot water through the pipe and nozzles. The cleaning water exits cavity 12 along channels 90 and tube 92. Also shown in FIG. 5 are supports 94 for conveyor belts 18 and 20. Preferably, supports 94 may be rollers which are fabricated of a microwave transparent material such as polypropylene; other types of support structures could also be used. Supports 99 may be used to elevate restraint belts 30 and 32 from the objects 16 to be heated; the advantage of this will be described later herein.

Conventional microwave suppression tunnels 46 and 48 are used to prevent the escape of microwave energy from the entrance and exit openings used for the conveyor belts. A plurality of one quarter-wavelength conductive posts 97 having closest centers spaced one quarter-wavelength apart are mounted in each suppression tunnel. As is known in the art, this described post structure is effective for preventing microwave leakage in conveyorized microwave systems which are used to process relatively low profile product. Posts 97 are not drawn to scale in FIGS. 4 and 5.

Figures 7A, 7B:
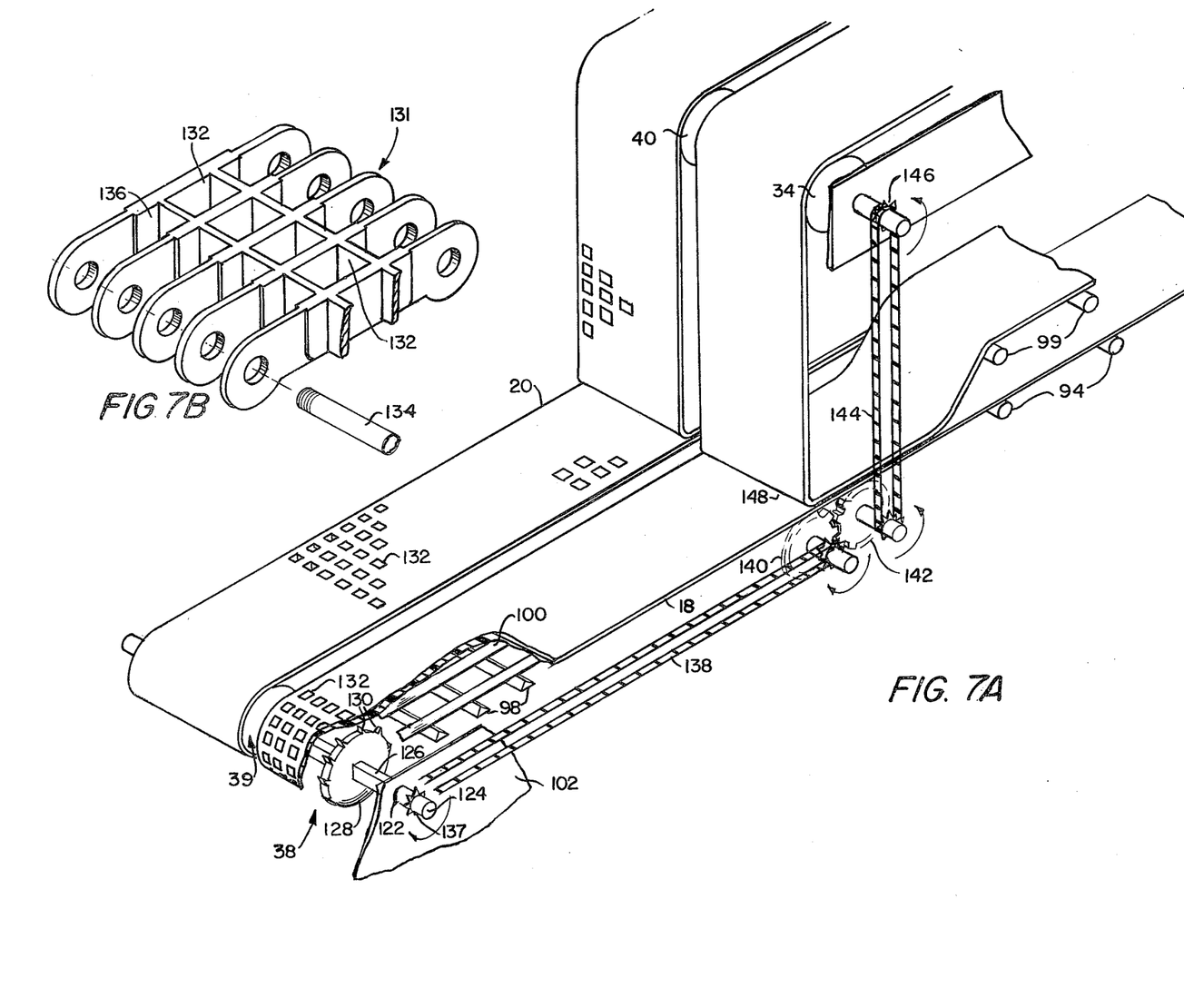
FIG. 7A is an isometric projection view of certain parts in the loading zone region of FIG. 2.
FIG. 7B is an expanded view of a section of the conveyor belt.

Again referring to FIGS. 2, 3 and 4, conveyor belts 18 and 20 are continuous loops that pass through cavity 12 and suppression tunnels 46 and 48. At unloading zone 44, frame table 96 supports belts 18 and 20. Table 96 has a top consisting of a plurality of inverted V-channel beams 98 supporting metal slides 100 which are disposed in the direction of belt movement; these parts are shown in FIG. 7A. A similar frame table 102 and top is provided at loading zone 14. Table 96 and the belts at unloading zone 44 are shown with interruption brake lines to indicate that it may be desirable to have a relatively long unloading zone such as, for example, 20 feet. Accordingly, automatic unloading equipment could be used.

Motor 22 is coupled through gear reduction assembly 105 to chain drive 104 which drives axle 24 which is rotatably mounted to frame table 96. Drive axle 24 is identical to axle 38 which is shown in detail in FIG. 7A and will be described with reference thereto. For purposes here, it is sufficient to state that motor 22 drives axle 24 in a clockwise direction which pulls belt 18 through cavity 12. The weight of belt 18 causes the span between axle 38 and axle 24 to be somewhat taunt. Motor 26 drives belt 20 in a similar manner but it may operate belt 20 at a different speed than belt 18. As shown in FIG. 2, belts 18 and 20 are driven in a clockwise loop. Belts 18 and 20 pass through horizontal slots 108 in cleaner 110 which includes hot water spraying apparatus similar to pipe 93 and nozzle fittings 95. After cleaner 110, belts 18 and 20 pass under and are guided along plate 112 which is connected to legs 58. Guard shields 113, 114, 115 and 116 cover the respective drums or axles to provide safe operation. More specifically, the shields prevent clothing or hands from getting caught in the gears and sprockets. Dotted lines extending from belt 18 in FIG. 2 show the path of the product supporting belts 18 and 20 and product restraint belts 30 and 32. Belts 30 and 32 pass through horizontal slots 118 in the sides of cleaner 120 which is similar to cleaner 110; hot water is sprayed over the belts to remove food by-products. Air knife 111 may provide a blade of air across belts 18 and 20 to blow grease off of the surface of the food.

Referring to FIG. 7A, an isometric projection view illustrating selected structure in the region of the loading zone of the system is shown. Axle 38 is rotatably mounted to frame table 102 by a conventional method such as a circular hole 122 or a bracket. Axle 39 is not physically connected to axle 38 so that respective belts 18 and 20 can move at different speeds. The shaft of each axle has cylindrical ends 124 for rotating in circular holes 122 which may comprise a sleeve bearing. Each shaft also has a square central region 126 for rotating sprockets 128 which are inserted thereon. Sprockets 128 have teeth 130 which engage apertures 132 in the belts. Generally, one of the sprockets engaging a belt is securely connected to the square central region 126 and the other sprockets can move horizontally on the square to compensate for variances in the spacings of the aperture lines of the belt. Referring to FIG. 7B, an expanded view of a segment 131 of a belt is shown. The belts are fabricated of a microwave transparent material such as high temperature plastic and preferably consist of perforated strips that are interleaved and fastened together with plastic rods 134. The perforations 136 permit cooking by-products such as grease to drip away from the food. The rods 134 which are inserted transverse to the direction of movement permit rotation of the two connecting strips whereby the belt, although somewhat rigid, can pass around the axis of an axle. The axles, sprockets, and belts are commercially available. For example, an Intralox, Inc., of New Orleans, LA, Model Flush Grid belt may be used with six one-half inch sprockets.

Again referring to FIG. 7A, axles 38 and 39 are driven by movement of respective belts 18 and 20 as imparted by drive axles 24 and 28, respectively. The cylindrical end 124 of the shaft of the axle extends outwardly from circular hole 122 and drive gear 137 is connected thereto. Chain 138 imparts the motion of drive gear 137 to gear 140 which is engaged to gear 142. Chain 144 imparts motion from gear 142 to drive gear 146 which is connected to axle 34. As shown in FIG. 7A, drive gear 137 is driven clockwise by axle 38. Accordingly, gear 140 is driven clockwise and gear 142 is driven counterclockwise. The clockwise motion of gear 142 imparts counterclockwise rotation to drive gear 146 which is mounted on axle 34. Accordingly, belt 30 is driven in a counterclockwise direction. The ratios of the above gears are such that belts 18 and 30 move at the same speed. They contact first at a point 148 outside suppression tunnel 46 and proceed through cavity 12, belt 30 being supported by belt 18. Any food on belt 18 is pressed downward toward belt 18 by the weight of belt 30. Axle 39 is coupled to axle 40 in a manner similar to the one just described. Accordingly, belt 32 is driven at the speed as belt 20.

Generally, in a microwave oven, the parameters that determine the number of BTUs generated in a food body having a given weight and dielectric properties are the available microwave power, the product loading, and the time of exposure. It follows that any one or a combination of these three parameters can be changed to vary the degree of cooking doneness. Typically, however, it is not desirable to reduce the total amount of microwave power available because this action reduces the throughput of the system. For example, in the embodiment described herein, a total of 60 Kw of microwave energy is available from two Raytheon Model MK50B transmitters; to reduce the power settings of the transmitters necessarily means that in a given time period, less product can be processed. Although the actual output power of a microwave energy source is dependent on the impedance match to the load, for discussion herein, the output power of the source will be considered to be a constant.

The number of BTUs generated in a given food body is in part a function of product loading. For example, if a given food body is the only load in the oven, the total output power of the source is divided between it and what can be categorized as oven losses. More specifically, the efficiency of a conveyorized microwave oven can be approximated by the following equation:

$$N = L/L + W \qquad (1)$$

where $N$ is the efficiency, $L$ is the density of the food expressed in pounds per foot, and $W$ is the effective dummy load expressed in pounds per foot; the dummy load includes the losses to the oven expressed in terms of equivalent food weight. In other words, the oven may be considered as an effective dummy load in parallel with the food. Accordingly, if the effective dummy load were equal to the food body, the efficiency would be 50% or half of the total microwave energy would be absorbed by the food. As other food bodies are added to the oven, the efficiency of the overall system increases but the absolute number of BTUs absorbed by a given food body decreases. Stated differently, while holding the output power and time of exposure constant, the number of BTUs generated in a given food body can be varied by adding or subtracting other food bodies from the oven. However, it is only under the most ideal set of circumstances and requirements that the balance of two different food types can be set such that both types can be simultaneously cooked to their desired donenesses. Furthermore, even if it were possible to simultaneously cook different foods to their desired donenesses by selecting the product loading to achieve the proper balance, the food ratio would normally create a significant operational constraint.

In accordance with the invention, a conveyorized microwave oven system is disclosed wherein different exposure times are simultaneously provided. More specifically, a plurality of conveyor lanes are provided and the rates of the lanes are independent of each other. Accordingly, different food types having different BTU requirements can be simultaneously transported through the microwave oven cavity with the respective food types being exposed to the microwave energy for different time periods. Also, the same food type can simultaneously be processed from different initial states or to different final states.

In accordance with the invention, the speeds of the plurality of product supporting lanes can be independently controlled. That does not mean, however, that the determination of the proper speed for a particular lane is independent of the product loading on the other lanes. More specifically, as an example of how the proper lane speeds can be determined, assume that there are two product supporting conveyor lanes with one transporting product A and the other transporting product B. Further, assume that the energy requirement of product A is 400 BTUs per pound and product B is 200 BTUs per pound. The energy requirement may depend on such factors as the initial temperature or the desired doneness. Also, assume that the loading density of product A is one pound per foot, the loading density of product B is three pounds per foot, and the effective dummy load of the oven expressed in terms of equivalent food weight is one pound per foot. In computing the efficiency for each lane, the other lane and the losses to the oven are considered to be the effective dummy load processing in parallel. Accordingly, for generalized equation (1);

$$W = L_B + L_o$$

or $$W = L_A + L_o$$

Therefore, the efficiencies for product A and product B, would be calculated as follows:

$$N_A = \frac{L_A}{L_A + L_B + L_o} = \frac{1}{1 + 3 + 1} = \frac{1}{5}$$

$$N_B = \frac{L_B}{L_B + L_A + L_o} = \frac{3}{3 + 1 + 1} = \frac{3}{5}$$

where $L_A$ is the load of product A, $L_B$ is the load of product B, and $L_o$ is the effective dummy load of the oven.

Because product A absorbs 20% and product B absorbs 60% of the 60 kw of radiated power, and because the energy requirements of the two products are known, the respective exposure times for this example can easily be calculated. Accordingly, the speed of the conveyor belts for an oven cavity of a particular length can also be calculated.

The example given above was for two product supporting lanes. It would be apparent to those skilled in the art that the invention would have advantage with more than two lanes. Also, many ways for independently controlling the speeds of the lanes would be apparent. For example, a single constant speed motor could be coupled to the respective lanes by a plurality of independently variable gear reduction assemblies. Also, a plurality of variable speed motors could be used.

The use of a single cavity 12 with a plurality of lanes to provide simultaneous exposure times of different lengths has advantages over the use of multiple systems for the same purpose. For example, with one multi-lane system, only one maintenance access door and associated choke is required. Also, only two microwave suppression tunnels are required. Another advantage is that less installation and operating space is required for a single multi-lane system. Furthermore, there is more flexibility in the automatic loading and unloading equipment that can be used.

As described earlier herein, food objects 16 are respectively sandwiched between product conveyor belts 18 and 20 and overhead restraint belts 30 and 32. The pressure exerted by belts 30 and 32 is used to control the size and/or the shape of the food during cooking. For various cooking tasks, different degrees of restraint or pressure may be desirable. The conveyor belt described earlier herein typically has a weight which exerts a downward pressure of approximately one pound per square foot. To raise or lower this weight, a different type of belt meeting the requirements can be used. Another way to raise the weight or increase the restraint of the belt is to pass the product support and restraint belts through pinch rollers that exert considerable pressure such as, for example, ten pounds per square foot on the food. Another way to reduce the weight of the restraint belt or the effect of its restraint is to elevate it for some distance within the cavity. For example, referring to FIG. 7A, the paths of belts 30 and 32 can be altered as shown such that they pass over one or more support rollers 99 so that food objects 16 are only restrained for part of the time during which they pass through cavity 12.

This concludes the Description of the Preferred Embodiment. The reading of it by one skilled in the art will bring to mind many alteration and modification without departing from the spirit and scope of the invention. Accordingly, it is intended that the scope of the invention be limited only by the appended claims.

What is claimed is:

1. The method of cooking product in a conveyorized microwave oven, comprising the steps of:
   providing a conductive cavity having first and second apertures on opposing walls for providing continuous access to the interior thereof wherein leakage of microwave energy is prevented by a first microwave suppression tunnel coupled with said first aperture and a second microwave suppression tunnel coupled with said second aperture;
   energizing said cavity with microwave energy;
   moving a first conveyor belt through said first aperture, said cavity and said second aperture for transporting product to be heated by said microwave energy;
   moving a second conveyor belt through said first aperture, said cavity and said second aperture for transporting product to be heated by said microwave energy; and
   controlling the speed of said first conveyor belt in accordance with the load of said product on said first conveyor belt, the load of said product on said second conveyor belt, and the effective dummy load of said oven.

* * * * *